(12) United States Patent
Ledder et al.

(10) Patent No.: US 7,712,426 B1
(45) Date of Patent: May 11, 2010

(54) MULTI-PURPOSE EXPEDITION VESSEL

(75) Inventors: Mark S. Ledder, Fredericksburg, TX (US); Roger Fyffe, Kemah, TX (US); Edward J. Ledder, Fredericksburg, TX (US)

(73) Assignee: Ledder High Risk Capital Ventures, LP, Fredericksburg, TX (US)

( * ) Notice: Subject to any disclaimer, the term of this patent is extended or adjusted under 35 U.S.C. 154(b) by 0 days.

(21) Appl. No.: 12/500,559

(22) Filed: Jul. 9, 2009

Related U.S. Application Data (60) Provisional application No. 61/079,182, filed on Jul. 9, 2008.

(51) Int. Cl.
*B63B 1/16* (2006.01)
(52) U.S. Cl. ..................... 114/65 R; 114/271; 114/288
(58) Field of Classification Search .............. 114/65 R, 114/271, 288
See application file for complete search history.

(56) References Cited

U.S. PATENT DOCUMENTS

| 3,109,407 | A | * | 11/1963 | Dorst .......................... 440/46 |
| 4,566,397 | A | * | 1/1986 | Cavanaugh et al. ......... 114/61.3 |
| 5,662,063 | A | * | 9/1997 | Seijas .......................... 114/361 |

* cited by examiner

*Primary Examiner*—Ed Swinehart
(74) *Attorney, Agent, or Firm*—Buskop Law Group, PC; Wendy Buskop (57) ABSTRACT

A multi-purpose expedition vessel having a aluminum alloy hull, where the aluminum alloy hull can have a aluminum alloy hull bottom with a deadrise bow elevated above a waterline, an aft portion comprising a stern, a port side, a starboard side, a central axis between the starboard and port sides. The aluminum alloy hull of the vessel can have a first plurality of lifting stakes secured to the port side of the deadrise bow, and a second plurality of lifting stakes secured to the starboard side of the deadrise bow. The aluminum alloy hull can have at least a first level disposed within the aluminum alloy hull, and the aluminum alloy hull can have a superstructure disposed on it having various structures, such as a stateroom, a steering station, or a floatation roof.

17 Claims, 6 Drawing Sheets

MULTI-PURPOSE EXPEDITION VESSEL

CROSS REFERENCE TO RELATED APPLICATIONS

The current application claims priority and benefit of U.S. Provisional Patent Application Ser. No. 61/079,182 filed on Jul. 9, 2008, entitled "Multi-Purpose Expedition Vessel". This application is hereby incorporated in its entirety.

FIELD

The present embodiments generally relate to a lightweight long distance multi-purpose expedition vessel capable of high speeds, over 30 knots, fast turns with stability that requires a draft of less than 6 feet and will not "turtle."

BACKGROUND

There exists a need for a multi-purpose expedition vessel that is low weight, capable of traveling long distances, and able to run at speeds in excess of 30 knots.

There exists a need for a vessel that has an ability to plane at high speeds in a fuel efficient manner, turn quickly and have a low sound signature.

There exists a need for a vessel that will not "turtle" in high seas.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that they can be practiced or carried out in various ways.

The embodiments relate to a multi-purpose expedition vessel, in which the multi-purpose expedition vessel can have an hull, which can be an aluminum alloy hull with a hull bottom, which can also be an aluminum alloy, a deadrise bow elevated above a waterline, a stern, a port side, and a starboard side.

A central axis can be located between the starboard and port sides.

In an embodiment between about 1 port lifting strake to about 6 port lifting strakes can be formed in the hull proximate to the edge of the port side of the deadrise bow. Between about 1 starboard lifting stake to about 6 starboard lifting strakes can be formed near the edge of the starboard side of the deadrise bow. The lifting strakes can be formed to be mirror images of each other.

On the aft portion of the hull bottom, a starboard tapered skeg can be secured proximate to the starboard side of the hull. Similarly, a port tapered skeg can be secured proximate to the port side of the hull. Each skeg can be secured to the aft portion to increase turning and similar directional stability. The skegs can also provide the feature of enabling dampening of roll which might otherwise occur to the hull. The skegs can also provide a reduction of lateral skidding of the hull during turns, particularly high speed turns of over 30 knots and up to 42 knots.

These embodiments can produce a very fast hull with high power water jet engines with a configuration that can be used for military and scientific purposes interchangeable. The vessel will not turn over or "turtle" in a heavy sea due to a unique floatation roof to be described later, and will not roll, due to the unique skeg design on the bottom of the hull.

The vessel is highly unique and can take about 3 feet to about 6 feet of draft, while able to attain stable high speeds of 42 knots. The vessel can be a lightweight vessel that can be lifted and carried by dry docks easily, and have high impact durability due to a metal hull.

The profile of the vessel can be a long, sleek design.

Below decks, interior of the hull can be a below decks level. This below decks level within the hull can have a forward section and aft section. The below decks level can have a forward accommodations area and an aft accommodation area. These accommodation areas can also be referred to herein as staterooms.

This vessel is incredible safe, as the below decks level can have an additional accommodation watertight bulkhead, which can be disposed between the forward accommodations and the aft accommodations. This can provide safety in case of damage to the vessel hull due to puncture from an aggressive third party source.

To make this vessel even more safe, it can also have a collision bulkhead in the bow of the hull.

To increase the versatility of the vessel for scientific purposes, a dry goods storage area can be adjacent to the collision bulkhead for holding scientific equipment and other materials that need reduced vibration.

For further safety and to use for holding grey water, and other fluids, a watertight multi-compartment storage area can be between the forward accommodations and the dry goods storage area. It can be contemplated that at least 4 compartments can be used in this location, for safety and for storage of grey water. The multi-component watertight compartment is generally not know on small vessels this size or in this manner, for the dual use of increased safety for the vessel, increased floatation in the case of damage, and storage.

The vessel can have an aft below deck section which can contain the engine room, at least one power generator in the engine room. In an additional embodiment from and two to three generators can be positioned in the engine room depending on electrical needs topsides for military or scientific purposes. Usable generators can be ones made by Westerbeke or Onan.

The vessel can further have in the aft below deck section a jet lazarette area that can hold three independently operable water jet drives. Examples of water jet drives usable in this vessel can be ones made by Hamilton or Ultra Dynamics.

A jet watertight bulkhead that has a dimension of being at least about 20 feet wide with fire retardant insulation, which can be located between the jet lazarette area and the engine room. The jet watertight bulkhead not only provides watertight safety features, but fire safety features as well. It can also be formed to dampen noise and vibration coming from the water jet drives to lower overall vibration throughout the vessel when the water jet drives are operating simultaneously.

The water jet drives can be connected to a navigational station on another level of the vessel with throttles and synchronization processors enabling all three water jet drives to operate either independently, for fast turning of the vessel, or simultaneously and in synchronization for maximum thrust from a single direction.

In this aft below deck section can be a plurality of fuel tanks between the aft accommodations and the engine room, which can be in communication with the at least one power generator and the water jet drives. The fuel tanks can be design to give a distance of the vessel of at least 1500 miles and up to 4000 miles, without refueling. The fuel tanks can be interconnected so that in a heavy sea, the vessel can be fueled from only one side, and then the fuel pumped to another side, for safety at sea.

The fuel tanks can be able to be reallocated between each other enabling the fuel tanks to operate as ballast to stabilize the vessel if a heavy piece of equipment has been loaded on the bow, or on the port deck of the vessel, with no other weight on the starboard deck to otherwise stabilize the vessel.

The vessel can have a superstructure with at least three additional levels. The first level of the superstructure can be a main deck level having an aft section and a bow section disposed directly above the below decks level.

The aft section can have an aft cockpit, a salon for gathering of the crew, a watertight main deck bulkhead can be disposed between the aft cockpit and the salon which can be a significant safety feature and unexpected on a small vessel. This watertight main deck bulkhead can extend from the port side to the starboard side crossing the complete width of the boat for added safety which can make the vessel useable in the artic cold rough waters. The vessel can further have a galley on this level of the aft section.

In the bow section, it can be noted that the bow section can be disposed between about 1 foot to about 3 feet below the aft section, This "divided" level can enable the vessel to carry more "lightweight" space, that is, sleeping space, in the bow, allowing the vessel to ride higher in the bow than other designs. The higher bow can allow the vessel to take heavier waves safer than other sized craft.

The bow section can have a main deck stateroom area with at least one and up to three or more small cabins, which can be located directly above the dry goods storage area. The dry goods storage area can be accessed not only from the cabins, but from the below decks level access doors.

Also in the bow section can be a watertight bulkhead located between the galley and the main deck stateroom area.

Above this main deck level can be a pilot house steering station level. The pilot house steering station level can have the aforementioned navigational controls, which can be connected to the water jet drives and all the controls for operating the generators and other mechanicals on board, such as anchor winches, the tow kite, lights, running lights, anchor lights, fuel crossovers, and ventilator fans. Additionally, the pilot house steering station level can further have global positioning system "GPS" navigation, which can allow the vessel to perform dynamic positioning. An optional bow thruster can also be operated from the pilot house steering station level.

Above the pilot house level can be a flying bridge steering station level. The top of the flying bridge steering station level can have a fixed roof that can be a special floatation roof. This floatation roof can be made of aluminum. This floatation roof can have a size of about 16 feet long to about 18 feet wide. The floatation roof can help prevent the vessel from rolling, turteling or capsizing in heavy seas.

The vessel can be capable of operating at speeds of at least 28 knots and up to 42 knots.

It can be noted that the water jet drives of this vessel can provide a low sound signature that can enable the vessel to operate in a "stealth" like mode unlike other noise diesel powered vessel without this type of insulation provided in this vessel.

The vessel can have an overall length from about 90 feet to about 120 feet, and an overall width from about 20 feet to about 30 feet. The weight of the vessel can be very light for such a large vessel, which can be between about 100 tons to about 180 tons.

The deadrise bow is about 7 feet to about 15 feet above the waterline.

The vessel hull can have a flat center portion between the first and second skegs that can extend generally from the bow to the stern. The flat center portion can have a width that changes, and can extend from about 1 foot to about 20 feet. The flat center portion can be contemplated to be wedge shaped, for generally opening shape that can provide remarkable stability with only requiring a few feet of draft for high speed stable turns.

The design of the vessel can contemplate in an embodiment, that a water jet drive protection platform can be formed aft of the hull to protect the water jet drives when the vessel operates in reverse. The water jet drive protection platform can be hinged or removable.

Another embodiment can contemplate that the vessel can have an aft supply deck disposed in the aft on the pilot house steering station level for carrying at least one tender, or carrying equipment safely while underway.

The vessel can have a tow kite compartment in the main deck stateroom area with a closable watertight opening, which can be between a forward deck above the main deck stateroom area in the bow.

The tow kite compartment can further have a tow kite. The tow kite compartment can further have a lightweight tow line, secured to the tow kite, a winch for retracting the tow kite with the lightweight tow line, and a helium deployment means for elevating the tow kite to a tow kite operation level. the tow kite can enable the vessel to move at a velocity up to about 5 knots without fuel consumption. The tow kite can further to be used for long term passages, of at least a few hours, for multi-mile use, or for emergency deployment in case all power fails and the vessel needs to move.

An embodiment can contemplate that the superstructure can be a modular unit for securing to the hull. An embodiment can contemplates that the pilot house steering station level can further comprise pilot house accommodations.

The hull bottom can have a flat center portion and a deadrise bow elevated above the waterline. The hull can have an aft portion comprising a stern, and the flat center portion can extend from the bow to the stern. The flat center portion can have a variable width. A bow thruster can be disposed in the deadrise bow, and a bow sprit can also be disposed on the deadrise bow.

The hull can typically have a port side, a starboard side, a central axis between the starboard and port sides, a first plurality of lifting strakes secured to the port side of the deadrise bow, and a second plurality of lifting strakes secured to the starboard side of the deadrise bow. In an embodiment, the lifting strakes can be disposed on the port and starboard sides of the hull near the deadrise bow. Such a configuration can allow the impact from waves to be moved away from the bow, and pressure from the water passed along the hull. This reduces unnecessary vibrations to the vessel, thus providing greater stability and a more comfortable ride for occupants.

The deadrise bow can typically be elevated above the waterline with a pronounced rise to deflect waves and provide a "wave slicing" or "wave cutting" feature to the vessel. This feature can also provide more stability, and allow the deck near the deadrise bow to be safely used.

The deadrise bow can have a rise from about 7 feet to about 13 feet above the waterline and the forward most part of the deadrise bow can be a smooth V-shaped bow. In an alternative embodiment, the deadrise bow can be used if hydrophones or other expedition equipment need to project in front of the vessel while underway.

The vessel can have at least one first tapered skeg secured to the aft portion of the port side, and at least a second tapered skeg secured to the aft portion of the starboard side. The vessel can have at least four levels, and one of the levels can be disposed within the hull. The vessel can also have a superstructure disposed on the hull.

The superstructure can have at least one stateroom area located on at least one of the levels, and at least one steering station can be disposed above the at least one stateroom area. More than one stateroom area can be created on the vessel, and any of the stateroom areas can be a multi-purpose stateroom, such as a operating as a research laboratory and a special function room. The steering station can be open air, like a flybridge, or it can be enclosed. Enclosing the steering station can provide the ability to operate better under different environments, such as harsh weather conditions. The superstructure can also have a floatation roof disposed above the steering station for aiding in preventing the vessel from rolling, turtleing or capsizing in heavy seas or to stay afloat longer in case of unexpected swamping.

On any or each of the at least one levels there can be various rooms and areas. For example, at least one cabin for occupancy, such as for sleeping or eating. Or as another example, it can be contemplated that a galley or a stateroom area for sleeping by the captain or a passenger can be located on a level.

In an embodiment, at least one hydraulically operable crane can be disposed on the vessel. The hydraulically operable crane can be adapted to haul elements from alongside the hull to at least one level of the multi-purpose expedition vessel. The elements can be a tender, tender with motor, a buoy, cargo, or other materials. In another embodiment, the crane can be located on the fore area of the vessel. In yet another embodiment, the crane can be located in the aft area of the vessel. The crane can be rotatable, telescoping, or combinations thereof.

The hull can have at least one deck interior of the hull and at least one deck exterior of the hull. In an embodiment, there can be two decks, with one of the decks sequentially disposed above the hull.

The hull can have a first spray rail chine on the port side and a second spray rail chine on the starboard side. The multi-purpose expedition vessel can have a draft from about 4 feet to about 6 feet.

A platform can be disposed aft of the hull. A drive protection platform can be secured to the aft above the waterline. The multi-purpose expedition vessel can have a drive protection platform secured to the aft above the waterline.

The multi-purpose expedition vessel can have at least one fuel tank disposed within the hull, and can have a capacity to contain at least 3400 gallons of fuel. The fuel tank can be integral to the hull, and it can extend the whole distance between the starboard and port sides.

In an embodiment, the vessel can have a second fuel tank having a capacity to contain at least 1700 gallons of fuel that can be disposed proximate the port side of the hull. For example the second fuel tank can be adjacent to the first fuel tank on the port side. The second fuel tank can be in fluid communication with the first fuel tank.

In an embodiment, the vessel can have a third fuel tank having a capacity to contain at least 1700 gallons of fuel that can be disposed proximate the starboard side of the hull. The third fuel tank can be in fluid communication with the first fuel tank, and it can be adjacent to the first fuel tank on the starboard side.

The second and third fuel tanks can be connected together by a crossover valve, which can enable fuel from a full tank to drain into a less full tank for more even planing of the multi-purpose expedition vessel and for real time adjustment of the plane of the multi-purpose expedition vessel. This feature can help prevent the multi-purpose expedition vessel from listing more excessively from one side to the other during heavy seas or can be used as a real time adjustable ballasting system for the vessel in case something heavy is loaded unevenly on one of the vessel sides.

A fourth fuel tank and a fifth fuel tank can be disposed below the deck within the hull. The fourth and fifth tank can be in fluid communication with the first fuel tank. In another embodiment, each fuel tank can be in fluid communication allowing fuel to transfer from any one of the fuel tanks to another of the fuel tanks.

Tubing can be disposed between the fuel tanks. The tubing between the fuel tanks can serve as automatically adjustable roll dampening devices when connected to control equipment on the flybridge or located elsewhere in the multi-purpose expedition vessel. The tubes can have an outside diameter ranging from about 2 inches to about 5 inches. From about 1 tube to about 5 tubes can be used between the fuel tanks, either all located at one end of the tanks or disposed at intervals along the fuel tanks for easier ballasting.

An embodiment of the invention can have at least one fresh water tank. It can be possible to have two fresh water storage tanks in fluid communication with each other, for which the combination can be used for ballasting the vessel. The fresh water tank can be isolated by a cofferdam.

The fuel tanks and the fresh water tanks can be connected to a control system, which can be a computer controlled system. The control system can ballast the vessel port to starboard, as well as deadrise bow to stern, for maximizing fuel efficiency and conservation while also providing comfort and safety to the passengers or occupants of the vessel. The multi-purpose expedition vessel can have the unique ability to be ballasted real time and simultaneously with fuel tanks and water tanks while planing at a high speed, such as in excess of 42 knots.

A plurality of water tight areas can be located within the hull, each sequentially in communication. At least one water tight area can be disposed near the base of the bow. It can be contemplated that up to five water tight areas can be used, connected together in series. The water tight areas can be positioned to prevent complete flooding of the multi-purpose expedition vessel if the outer-skin of the hull is pierced. The water tight areas are not contemplated to extend the length of the keel, but rather from port to starboard in series. This provides significant safety protection in case the multi-purpose expedition vessel hits a floating or submerged object, or any other kind of collision.

For example, if the skin of the hull is pierced and water starts to enter the hull, the water tight area can be closed and can contain the water until the water tight areas are full at which time pressure equilibrium between the watertight area and water entering the pierced hull skin would be reached and the water would not flow into the hull through the pierced skin. This function ensures the multi-purpose expedition vessel can stay afloat even if the hull skin is pierced.

It can be contemplated that the doors in the vessel, the engine room, the jet drive lazarette area, and the accommodations and/or staterooms are designed to be watertight areas. In addition a watertight area can be disposed below the chain locker of the anchor system.

The multi-purpose expedition vessel can be propelled using jet drives, surface piercing, open propellers, water, wind, or similar drive means commonly known in the art for propelling a vessel. In an embodiment, the multi-purpose expedition vessel can be propelled by at least one drive unit in the aft portion. The drive unit can be powered by at least one generator.

The drive unit can include water jet pumps, which can be driven by diesel engines. For example, three drive units can be driven by three diesel engines. As an additional feature, the drive units can provide a low sound signature. The drive units can be water jet drives, such as those made by Hamilton or Ultra Dynamics.

The vessel can have a self-deploying kite for providing auxiliary propulsion. The kite can be a tethered helium assisted kite, nylon fabric, or similar fabric, such as Kevlar™.

It can be contemplated that the multi-purpose expedition vessel can have an overall length from about 40 feet to about 140 feet. In an embodiment, the vessel can have an overall width from about 25 feet to about 30 feet. This range of size can be useful for enabling the vessel to pass through smaller canals and locks without special permits.

The weight of the multi-purpose expedition vessel can range from about 100 tons to about 160 tons.

It can be expected that the multi-purpose expedition vessel can have a range of between about 3,000 nautical miles to about 4,000 nautical miles.

Additionally the multi-purpose expedition vessel can have a sanitation system capable of providing sanitation for a number of passengers. The number of passengers provided for depends upon use and duration of trip.

The multi-purpose expedition vessel can have a communications system onboard. It can be contemplated that the multi-purpose expedition vessel can have a WIFI or similar network enabling occupants to use personal digital assistants or similar devices to communicate with each other, weather stations and offices in different locals.

The multi-purpose expedition vessel can generate its own power from the fuel in one of or all of the fuel tanks using a diesel generator or a similar power source that can provide power for food preparation, navigation, communications, radar, pumps, and special equipment on board, such as laboratory or medical equipment, if the multi-purpose expedition vessel was a medical ship. The power can run an AC conditioner or chiller for environmental control. The self-generated power can be used to run compressors for dive tanks used in teaching students about marine biology or a similar field.

As described, the purpose(s) of the vessel is (are) multiple, including operating as a training ship, a floating classroom for students, a research vessel, a patrol vessel, or combinations thereof. The multi-purpose expedition vessel is capable of traveling long distances due to the light weight design. The light weight design saves on fuel by decreasing the required fuel to travel long distances.

Figure 1:
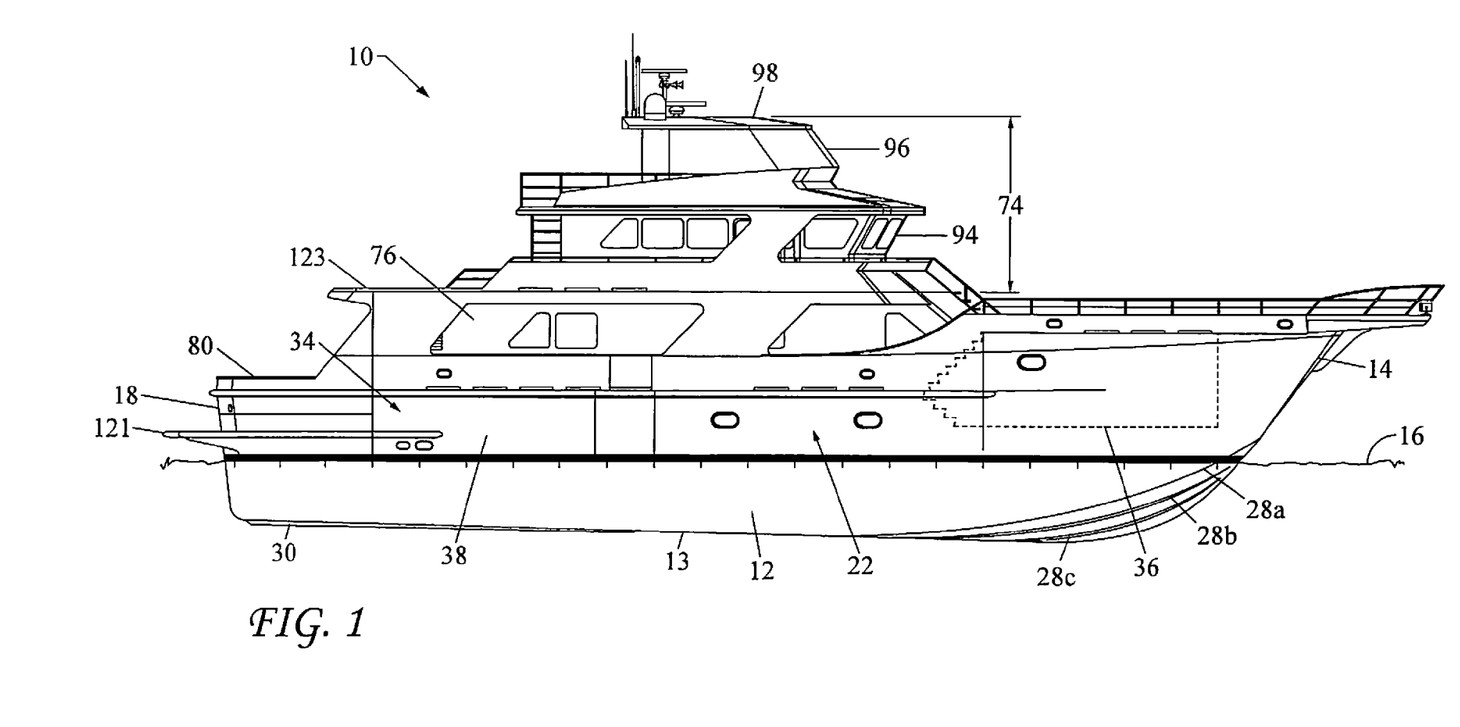
FIG. 1 depicts a side view the multi-purpose expedition vessel.

Now turning to the Figures, FIG. 1 shows the multi-purpose expedition vessel 10 profile from the starboard side.

The vessel 10 can have an aluminum alloy hull 12, which can be a planing aluminum alloy hull. The aluminum alloy hull 12 can have a thickness from about ¼ inch to ½ inch, and can be a single aluminum alloy hull or double aluminum alloy hull.

The vessel can be made from various aluminum alloy material that can be welded, riveted or similarly assembled together to form the general vessel shape or structure shown in profile.

FIG. 1 further shows the aluminum alloy hull 12 can have a below deck level 34, which can be disposed between the port side 20, not shown in this Figure, and the starboard side 22.

The aluminum alloy hull 12 can have an aluminum alloy hull bottom 13 which can take about a 4 foot draft. The stern 18 is shown, which can further include a water jet drive protection platform 121.

The decks of the vessel can be made from aluminum or other comparable material of construction, and can be coated with a nonskid surface or painted to prevent degradation in harsh conditions.

FIG. 1 further shows the deadrise bow 14 above the waterline 16.

Adjacent the deadrise bow 14 in the hull can be the starboard lifting strakes 28a, 28b, 28c.

The below deck level 34 can have a forward section 36 and an aft section 38.

The superstructure 74 of the vessel is depicted, which can have additional levels.

This view shows the main deck level aft section 76, the pilot house steering station 94, and the flying bridge steering station 96 topped by the floatation roof 98.

This FIG. 1 also shows the aft cockpit 80 and the aft supply deck 123.

The floatation roof 98 can be made from hollow aluminum and can be watertight. The flotation roof 98 can help prevent the vessel from rolling to a turtle position in a heavy sea.

Figure 2:
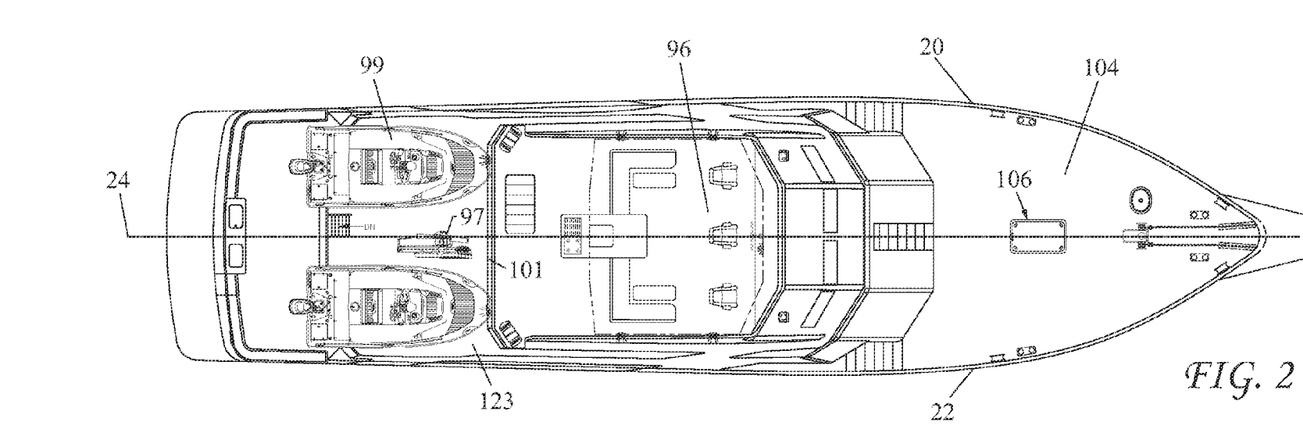
FIG. 2 depicts a top view of the flying bridge level of the vessel.

FIG. 2 shows a top view of fourth level above the pilot house steering station, referred to as the flying bridge steering station 96, or "the flying bridge" level.

This Figure further shows the port side 20, the starboard side 22 and the central axis 24 of the vessel. This Figure further shows the forward deck 104 with the tow kite compartment 106.

On the flying bridge level, the flying bridge steering station 96 ends at edge 101 and the aft supply deck 123 is viewable which can support at last one tender 99 or other pieces of equipment and a lifting means such as a hydraulic arm 97.

Figure 3:
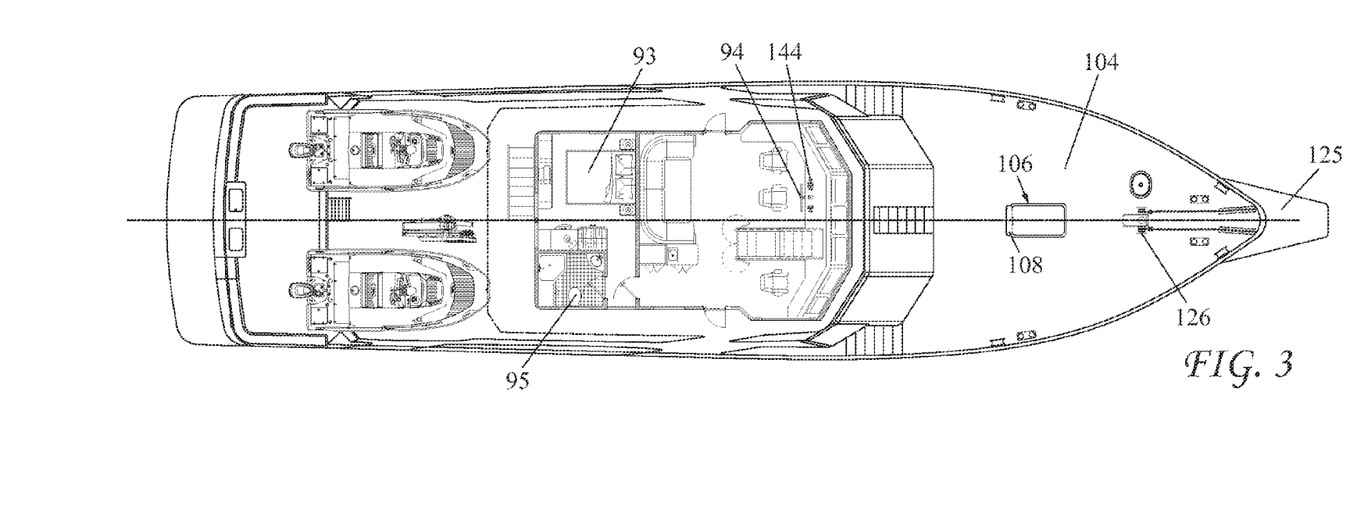
FIG. 3 depicts a top view of the pilot house level of the vessel.

FIG. 3 shows a top view of the third level above the pilot house steering station, referred to herein as the "pilot house level", with the pilot house steering station 94.

FIG. 3 further depicts the pilot house accommodation 93 with pilot house head 95. In this Figure, the tow kite compartment 106 is shown on the forward deck 104 with a hatch 108, that can be a closable watertight hatch for the two kite compartment. Also shown in this Figure is the anchor system 125 and winch 126.

Figure 4:
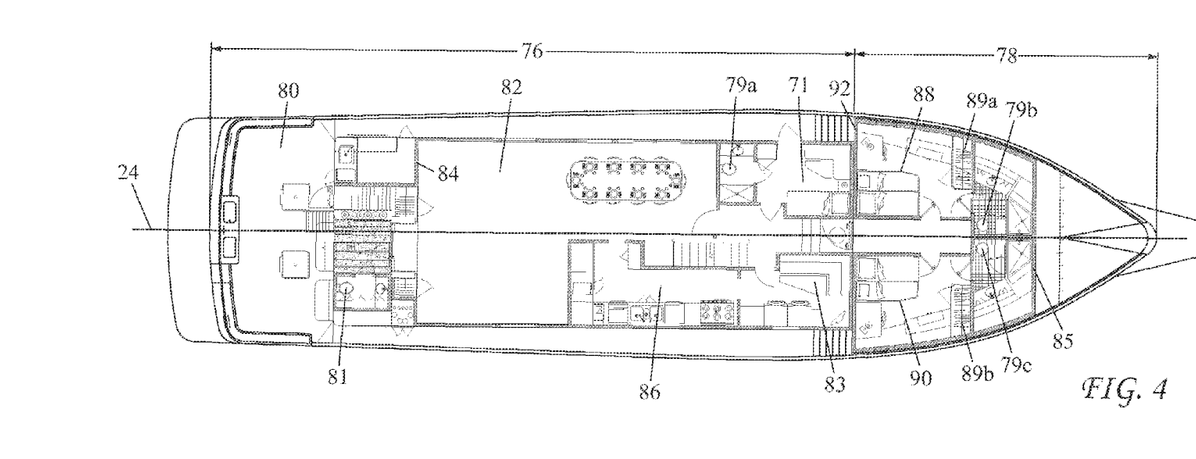
FIG. 4 depicts a top view of the main deck level of the multi-purpose expedition vessel.

FIG. 4 shows a top view of the next level above the below deck level and is referred to herein as the "main deck level".

FIG. 4 is the main deck level of the vessel and shows the aft cockpit 80, with a main deck level aft head 81, which can be separated from salon 82 with a first watertight main deck bulkhead 84. On the main deck is a second watertight main deck bulkhead 92 extending from the port side to the starboard side like the first watertight main deck bulkhead 84.

Past the second watertight main deck bulkhead 92 can be the main deck stateroom area with a first stateroom 88, which can have a first stateroom head 79a, a second stateroom 90, which can have a second stateroom head 79b and a third stateroom 71, which can have a third stateroom head 79c.

The multi-purpose expedition vessel can be contemplated to have at least 6 and up to about 8 heads in an embodiment. A main deck level aft head 81 is also shown in this Figure.

There can be at least one main deck storage area 89a, 89b between the second watertight main deck bulkhead 92 and a third watertight main deck bulkhead 85. This level can generally be considered to have two areas, a main deck level aft section 76 and a main deck level bow section 78. The main deck level bow section 78 can be about 1 foot below the main deck level aft section 76 for a staggered configuration.

Adjacent the salon 82 can be a galley 86 with a main deck mess 83. The central axis 24 is also depicted in this Figure.

The multi-purpose expedition vessel can also have a crew lounge as part of the salon, and a laundry area can adjoin the galley.

Figure 5:
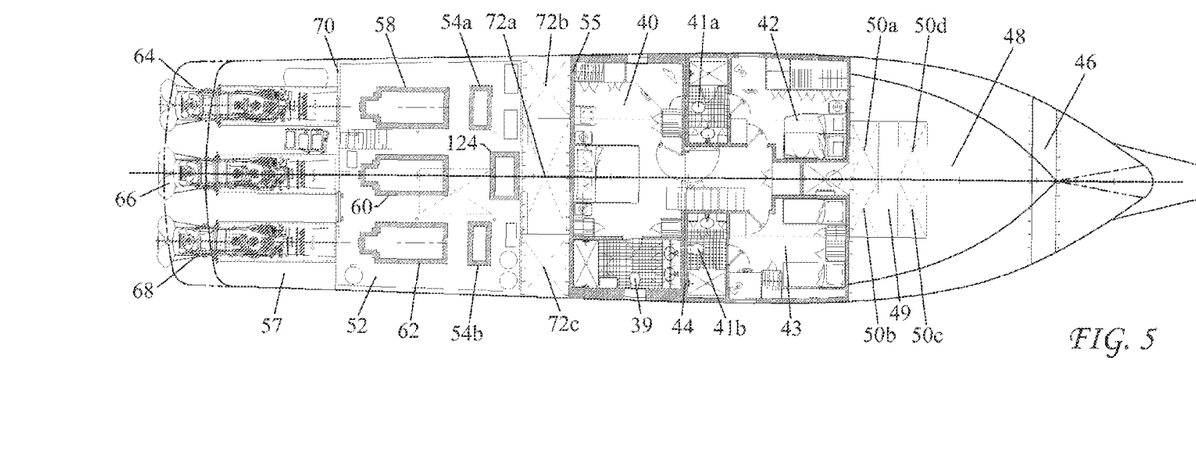
FIG. 5 depicts a top view of the below decks level of the multi-purpose expedition vessel.

FIG. 5 shows a top view of the lowest level in the hull and is referred to herein as the "below deck level".

A first fuel tank 72a can be disposed in the aft section of the multi-purpose expedition vessel on the below deck level 34. The first fuel tank 72a can extend over both sides of the central axis. The first fuel tank 72a can have a capacity to contain at least 3,000 gallons of fuel. The first fuel tank 72a can be integral with the aluminum alloy hull.

A second fuel tank 72b can be adjacent to the first fuel tank 72a. The second fuel tank 72b can extend from the port side to the first fuel tank 72a. The second fuel tank 72b can have a capacity of containing at least 2,000 gallons of fuel.

A third fuel tank 72c can be adjacent to the first fuel tank 72a and can extend towards the starboard side. The third fuel tank 72c can have a capacity to contain at least 2,700 gallons of fuel. Each fuel tank can be in communication with one of the three engines 58, 60, 62 shown. The engines can be diesel engines or electric engines.

The second fuel tank 72b and the third fuel tank 72c can communicate between at least 1 tube and up to about 10 tubes to the first fuel tank 72a. The first tube can be placed between the second fuel tank 72b and the third fuel tank 72c. The tubes can act as roll dampeners and are not shown in the Figures. The flow of fluid through the tubes can be controlled automatically and simultaneously from a control unit located near or in the pilot house steering station or the flying bridge steering station to ballast the vessel while operating either on plane or while underway at a slow speed.

The engines 58, 60, 62 can communicate with the water jet drives 64, 66, 68 which can be located in the jet lazarette area 57. This Figure also depicts least two generators 54a, 54b and air conditioning unit 124. Other associated mechanicals such as bilge pumps, macerators for the heads, fresh water pumps, and similar items found on a floating vessel can further be supported.

The at least two generators 54a, 54b can be used to provide power to the multi-purpose expedition vessel.

A watertight bulkhead 70 can be located between the engines 58, 60, 62 and the jet lazarette area 57.

The engines 58, 60, 62 can be located in a engine room 52 of the aft section of the below deck level. In an embodiment, the engine room 52 can also have a water heater The engines 58, 60, 62 can be used to drive the water jet drives 64, 66, 68. The engines can each drive a water jet pump for each of the water jet drives 64, 66, 68. Each of the engines 58, 60, 62 can have a power of at least 1800 horse power.

The engine room 52 and the jet lazarette area 57 can be vented to the outside. The engines 58, 60, 62 and water jet drives 64, 66, 68 can be designed to have a very low sound signature.

The engine room 52 and the jet lazarette area 57 can be separated from each other or can be integral with each other.

The water jet drives 64, 66, 68 can draw water from a hole in the bottom of the multi-purpose expedition vessel, pressurize the water, and force the water out of the water jet drives propelling the multi-purpose expedition vessel, with a low sound signature. Each of the water jet drives can include a nozzle for increasing the velocity of the water as the water leaves the water jet drives. The water exiting the water jet drives can exit the aft portion of the multi-purpose expedition vessel.

Another watertight bulkhead, the midship bulkhead 55 can be between the fuel tanks and first accommodations 40 below deck level. The first accommodations 40 can further have a head 39 and the stateroom can be surrounded by watertight bulkheads for providing safety flotation to the vessel.

The accommodation watertight bulkhead 44 can separate the first accommodations 40 from the second accommodations 42, which is shown on the port side of the vessel and a third accommodations 43, which is shown on the starboard side of the vessel, each having a head 41a, 41b.

A first fresh water tank 50a can be disposed on the port side of the multi-purpose expedition vessel adjacent to a first cofferdam 49. The first cofferdam 49 can isolate the first fresh water tank. The first fresh water tank 50a can have a volume ranging from about 180 gallons to over 500 gallon and can be in communication with a control unit 144, which can be mounted near or in the pilot house steering station 94, as shown in FIG. 3, and can be used to ballast the vessel simultaneously with the fuel tank ballasting, which can be performed in real time while under way or at the dock for dual ballasting simultaneously.

A second fresh water tank 50b can be disposed adjacent to the first cofferdam 49. The first cofferdam 49 can isolate the second fresh water tank 50b. The second fresh water tank 50b can be connected to the first fresh water tank 50a and can be in communication with the control unit 144, which can be mounted near or in the pilot house steering station 94, also shown in FIG. 3, for use in ballasting the vessel while underway. The volume of the second fresh water tank 50b can be the same or slightly larger or smaller than the first fresh water tank 50a. A third water tank 50c and fourth water tank, which can be a grey water tank 50d are also shown in this Figure. The fourth water tank, or grey water tank 50d can acts as a holding tank for the heads.

A collision bulkhead 46 is depicted in the bow as well as a dry goods storage area 48.

The multi-purpose expedition vessel below deck level is depicted having storage areas in addition to the fresh water tanks. The storage areas can be used to store water, supplies, or any mission specific items. The mission of the multi-purpose vessel typically determines the use of the storage areas.

Figure 6:
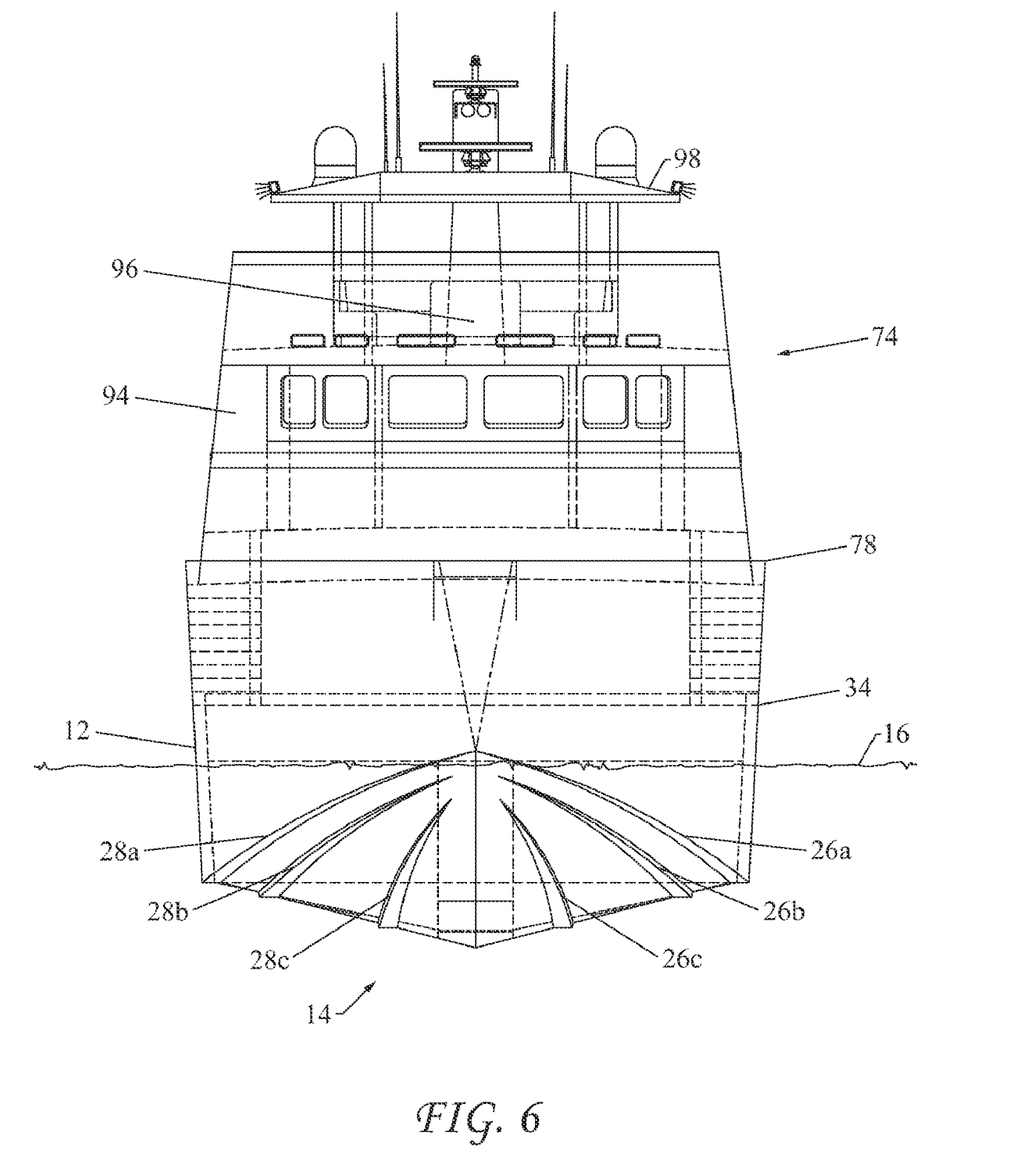
FIG. 6 depicts a front view of the multi-purpose expedition vessel.

FIG. 6 shows the deadrise bow 14 that can rise from the water line 16 near the front base of bow. The deadrise bow 14 can rise from about 7 feet to about 12 feet above the waterline 16.

In this Figure, the deadrise bow 14 is depicted having three port lifting strakes 26a, 26b, 26c disposed on the port side, and three starboard lifting strakes 28a, 28b, 28c disposed on the starboard side of the aluminum alloy hull 12.

The lifting strakes disposed on each side of the deadrise bow 14 can provide lift for the multi-purpose expedition vessel and allow for speeds of about 42 knots when all three engines are being used simultaneously.

Additionally in FIG. 6 is shows the floatation roof 98 disposed on the superstructure 74. The flying bridge steering station 96 and the pilot house steering station 94 are also shown. The main deck level bow section 78 is also indicated as well as the below deck level 34.

This vessel provides a low profile, low sound signature fast moving shallow draft, which can be less than a 6 foot vessel, which is incredibly stable and lightweight.

Figure 7:
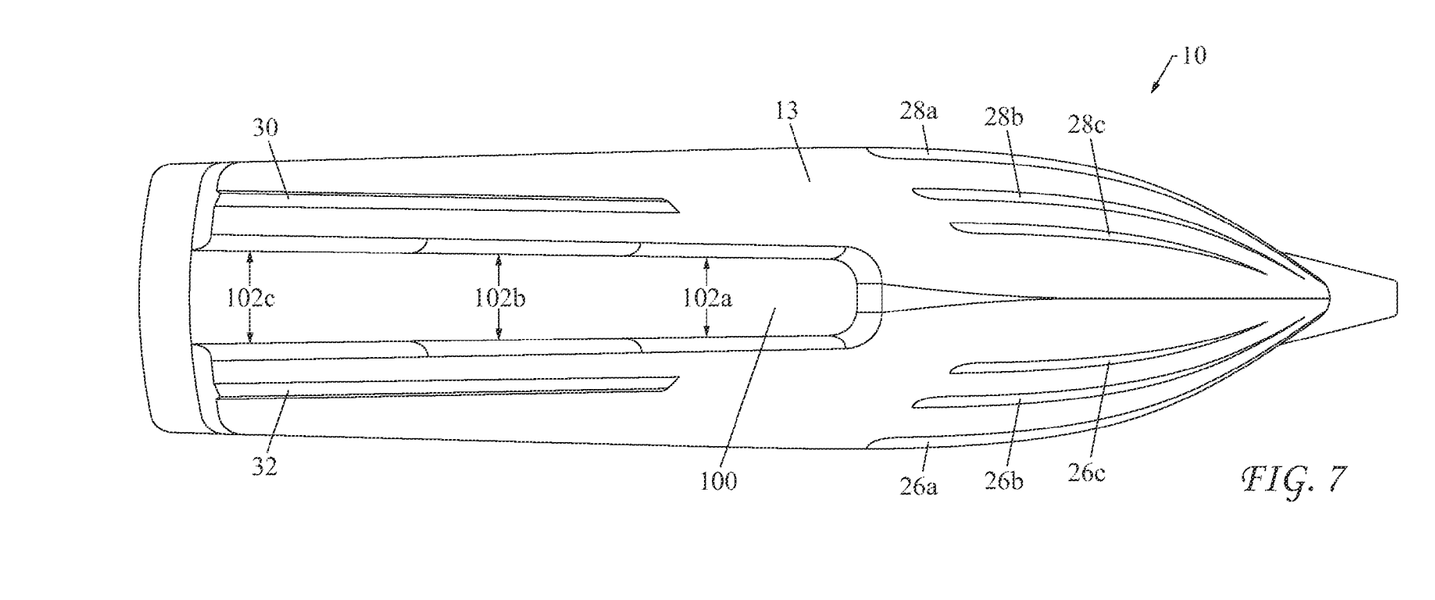
FIG. 7 is a bottom view of the hull of the multipurpose expedition vessel the flat portion.

FIG. 7 shows the multi-purpose expedition vessel 10 from a bottom view. In this Figure, the aluminum alloy hull bottom 13 is shown with the flat center portion 100 that can have a tapered width indicated by the first narrow width 102a that is smaller than the second narrow width 102b. The second narrow width 102b is smaller than the third narrow width 102c for the tapered flat center portion 100, which can be indented into the aluminum alloy hull bottom 13. The flat center portion can be between about 1 foot to about 20 feet in width, and can permit the planing with stability that this vessel provides.

Additionally this FIG. 7 shows a starboard tapered skeg 30 and the port tapered skeg 32 which can be taller at their ends near the stern, by about 50 percent than at the beginning near the bow. The skegs can be about 6 inches near the bow rising to about 12 inches near the stern.

This Figure also shows the starboard lifting strakes 28a, 28b, 28c and the port lifting strakes 26a, 26b, 26c as shown from a bottom view.

Figure 8:
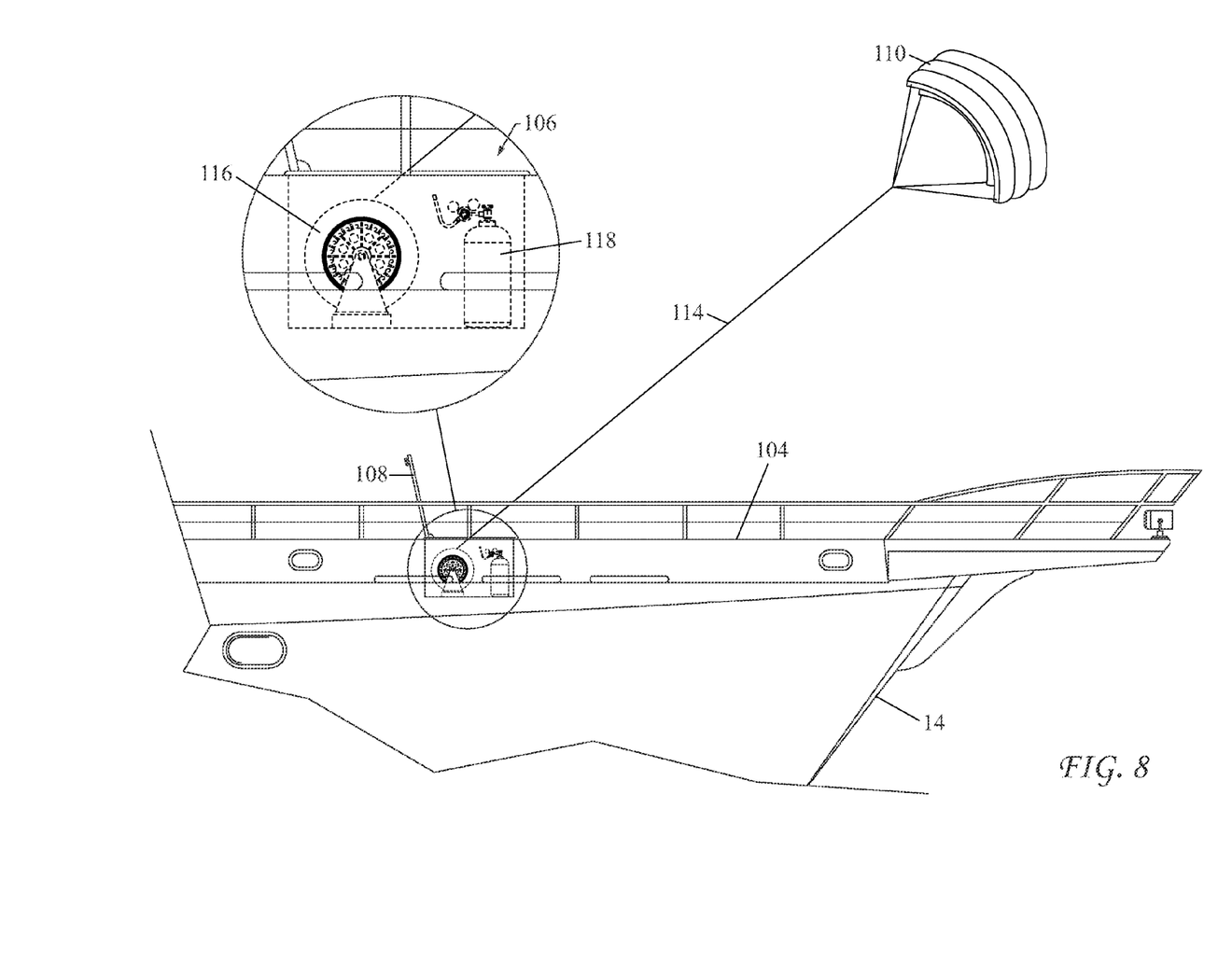
FIG. 8 is a detailed view of the tow kite compartment in the bow of the vessel.

FIG. 8 shows the tow kite compartment 106, which can be disposed on the forward deck 104 near the deadrise bow 14 of the vessel.

In the tow kite compartment 106 can be a winch 116 that can be connected to a lightweight tow line 114 that can engage the tow kite 110. In an additional embodiments a second tow line can be used to connect the kite in a harness like manner to the vessel.

In an embodiment, the winch 116 can be a hydraulic lifting means, which can include a winch and arm combination.

The tow kite 110 can be ejected from the tow kite compartment 106 using an inflation technique by blowing helium from a helium deployment means 118 into the tow kite 110 so it can lift out of the tow kite compartment 106 quietly, silently and into the air. This way, the vessel can be moved silently by the tow kite 110, pulled without engine noise at a speed of up to about 5 knots by the tow kite 110 for a silent maneuver that will not cause disturbance, such as to whales or similar wildlife nearby or provide a quiet no-fuel used propulsion of the vessel.

This FIG. 8 also shows the hatch 108, which can be closable and watertight for closing the tow kite compartment 106.

While these embodiments have been described with emphasis on the embodiments, it should be understood that within the scope of the appended claims, the embodiments might be practiced other than as specifically described herein.

What is claimed is:

1. A multi-purpose expedition vessel comprising:
    a. an aluminum alloy hull having an aluminum alloy hull bottom, a deadrise bow elevated above a waterline, a stern, a port side-, a starboard side, a central axis between the starboard and port sides, a plurality of port lifting strakes secured proximate to the port side of the deadrise bow, a plurality of starboard lifting strakes secured to the starboard side of the deadrise bow;
    b. a starboard tapered skeg proximate to the starboard side of the aluminum alloy hull and a port tapered skeg proximate to the port side of the aluminum alloy hull;
    c. a below deck level disposed within the aluminum alloy hull comprising a forward below deck section and an aft below deck section; wherein each skeg is secured to the aft below deck section enabling dampening of roll by the aluminum alloy hull and reduction of lateral skidding of the aluminum alloy hull during turns; wherein
        i. the forward below deck section comprises
            1. a first accommodations;
            2. a second accommodations;
            3. an accommodation watertight bulkhead disposed between the first accommodations and the second accommodations;
            4. a collision bulkhead in the deadrise bow of the aluminum alloy hull;
            5. a dry goods storage area adjacent the collision bulkhead; and
        ii. the aft below deck section comprises:
            1. an engine room;
            2. at least one generator in the engine room;
            3. a jet lazarette area comprising three independently operable water jet drives;
            4. a watertight bulkhead between the jet lazarette area and the engine room; and
            5. a plurality of fuel tanks between the first accommodations and the engine room in communication with the at least one generator and the water jet drives; and
    d. a superstructure comprising:
        i. a main deck level having an aft section and a bow section disposed above the below deck level; wherein the aft section comprises:
            1. an aft cockpit;
            2. a salon;
            3. a first watertight main deck bulkhead disposed between the aft cockpit and the salon, wherein the first watertight main deck bulkhead extends from the port side to the starboard side; and
            4. a galley;
            wherein the bow section is disposed from 1 foot to 3 feet below the aft section, wherein the bow section comprises:
                a. at least one first stateroom disposed above the dry goods storage area;
                b. a second watertight main deck bulkhead disposed between the galley and the at least one first stateroom;
                c. at least one main deck storage area disposed between the at least one first stateroom and the dry goods storage area;
        ii. a pilot house steering station level disposed above the main deck level;
        iii. a flying bridge steering station level disposed above the pilot house steering station level; and
        iv. a floatation roof disposed above the flying bridge steering station level for preventing the multi-purpose expedition vessel from rolling and turtleing in heavy seas.

2. The multi-purpose expedition vessel of claim 1, wherein the multi-purpose expedition vessel travels at a speed of at least 28 knots.

3. The multi-purpose expedition vessel of claim 1, wherein the water jet drives provide a low sound signature.

4. The multi-purpose expedition vessel of claim 1, wherein the overall length of the multi-purpose expedition vessel is from 90 feet to 120 feet, and wherein the overall width of the multi-purpose expedition vessel is from 20 feet to 30 feet.

5. The multi-purpose expedition vessel of claim 1, wherein the multi-purpose expedition vessel is capable of containing fuel in the plurality of fuel tanks enabling operation of the multi-purpose expedition vessel from 3,000 nautical miles to 4,000 nautical miles, without refueling.

6. The multi-purpose expedition vessel of claim 1, wherein the multi-purpose expedition vessel weighs from 100 tons to 180 tons.

7. The multi-purpose expedition vessel of claim 1, wherein the deadrise bow is 7 feet to 15 feet above the waterline.

8. The multi-purpose expedition vessel of claim 1, wherein the multi-purpose expedition vessel has a draft of 3 feet to 6 feet.

9. The multi-purpose expedition vessel of claim 1, wherein the aluminum alloy hull bottom further comprises a flat center portion between the starboard tapered skeg and the port tapered skeg that extends from the deadrise bow to the stern.

10. The multi-purpose expedition vessel of claim 9, wherein the flat center portion comprises a variable width.

11. The multi-purpose expedition vessel of claim 10, wherein the width varies from 1 foot to 20 feet.

12. The multi-purpose expedition vessel of claim 1, wherein a water jet drive protection platform is disposed on an aft of the aluminum alloy hull.

13. The multi-purpose expedition vessel of claim 12, wherein the water jet drive protection platform is hinged or removable.

14. The multi-purpose expedition vessel of claim 1, further comprising an aft supply deck disposed on an aft on the pilot house steering station level.

15. The multi-purpose expedition vessel of claim 1, further comprising a tow kite compartment disposed on a forward deck, wherein the tow kite compartment comprises:
   a. a tow kite;
   b. a lightweight tow line secured to the tow kite;
   c. a winch for retracting the tow kite with the lightweight tow line; and
   d. a helium deployment means for elevating the tow kite, wherein the tow kite enables the multi-purpose expedition vessel to move at a velocity from 1 knot to 4 knots without fuel consumption.

16. The multi-purpose expedition vessel of claim 1, wherein the superstructure is a modular unit for securing to the aluminum alloy hull.

17. The multipurpose expedition vessel of claim 1, wherein the pilot house steering station level further comprises pilot house accommodations.

* * * * *